(12) United States Patent
Tamaki et al.

(10) Patent No.: US 7,366,381 B2  
(45) Date of Patent: Apr. 29, 2008

(54) OPTICAL WAVEGUIDE CHIP AND OPTICAL COMPONENT COMPRISING SAME

(75) Inventors: Kentarou Tamaki, Tokyo (JP); Hideaki Takase, Tokyo (JP); Yuuichi Eriyama, Tokyo (JP); Shinji Ohba, Hadano (JP); Hideyuki Fujiwara, Hadano (JP)

(73) Assignee: JSR Corporation, Tokyo (JP)

( * ) Notice: Subject to any disclaimer, the term of this patent is extended or adjusted under 35 U.S.C. 154(b) by 102 days.

(21) Appl. No.: 10/550,534

(22) PCT Filed: Mar. 26, 2004

(86) PCT No.: PCT/JP2004/004242

§ 371 (c)(1),
(2), (4) Date: Sep. 22, 2005

(87) PCT Pub. No.: WO2004/088378

PCT Pub. Date: Oct. 14, 2004

(65) Prior Publication Data

US 2007/0014518 A1 Jan. 18, 2007

(30) Foreign Application Priority Data

Mar. 31, 2003 (JP) .............................. 2003-096435

(51) Int. Cl.
*G02B 6/30* (2006.01)
(52) U.S. Cl. .................................................... 385/49
(58) Field of Classification Search ................ None
See application file for complete search history.

(56) References Cited

U.S. PATENT DOCUMENTS 5,217,568 A * 6/1993 Tessier et al. ............. 216/99
6,088,492 A * 7/2000 Kaneko et al. ............. 385/14
6,272,275 B1 * 8/2001 Cortright et al. .......... 385/129
2003/0235785 A1 * 12/2003 Barclay et al. ........... 430/271.1

FOREIGN PATENT DOCUMENTS

| CN | 1285667 A | 2/2001 |
|----|-----------|--------|
| JP | 61-260208 | 11/1986 |
| JP | 63-194206 | 8/1988 |
| JP | 01-316710 | 12/1989 |

(Continued)

OTHER PUBLICATIONS

Kentarou Tamaki, et al. "Photolithographic Properties of Photosensitive Sol-gel Materials and their Application to Optical Waveguides", Journal of Photopolymer Science and Technology vol. 15, No. 1, 2002, pp. 103-108.

*Primary Examiner*—Rodney Bovernick
*Assistant Examiner*—Mike Stahl
(74) *Attorney, Agent, or Firm*—Oblon, Spivak, McClelland, Maier & Neustadt, P.C.

(57) ABSTRACT

An optical waveguide chip including a core portion as an optical waveguide, a clad portion composed of a lower clad layer and an upper clad layer, and an optical fiber guide portion which is formed integrally with the clad portion for positioning a single-mode optical fiber which is to be connected with the core portion. Each portion of the optical waveguide chip is formed by creating a layer of a radiation-sensitive polysiloxane composition by photolithography. At least two kinds of radiation-sensitive polysiloxane compositions are used so that the core portion has a higher refractive index than the clad portion.

6 Claims, 4 Drawing Sheets

FOREIGN PATENT DOCUMENTS

| | | |
|---|---|---|
| JP | 02-062502 | 3/1990 |
| JP | 8-271746 A * | 10/1996 |
| JP | 10-268158 | 10/1998 |
| JP | 2000-66051 | 3/2000 |
| JP | 2000-105324 | 4/2000 |
| JP | 2000-131556 | 5/2000 |
| JP | 2001-83342 | 3/2001 |
| JP | 2001-255428 | 9/2001 |
| WO | WO 03/010603 A1 | 2/2003 |

* cited by examiner

OPTICAL WAVEGUIDE CHIP AND OPTICAL COMPONENT COMPRISING SAME

TECHNICAL FIELD

This invention relates to an optical waveguide chip that is useful as a constituent portion of an optical component such as an optical multiplexer/demultiplexer used for optical communications, and more particularly relates to an optical waveguide chip that can be advantageously used for being connected with single-mode optical fibers.

BACKGROUND ART

When an optical multiplexer/demultiplexer having an optical waveguide is connected with optical fibers, precisely aligning the optical axis of the optical waveguide with the optical axis of the optical fibers is essential to reduction of optical transmission loss at the connection site.

Accordingly, techniques for aligning the optical axis of an optical waveguide with the optical axis of an optical fiber have been proposed in the past.

For example, there has been a proposal for an optical device in which an optical axis aligning guide and an optical waveguide are formed simultaneously by performing photolithography on a photosensitive resin on a support (see Japanese Laid-Open Patent Publications H1-316710 and H2-62502).

The optical axis aligning guide is provided in order to precisely align the optical axis of an optical waveguide with the optical axis of an optical fiber which is connected with the end face of the optical waveguide. The shape of the optical axis aligning guide is determined by the shape of the optical fiber.

A methacrylate resin capable of transmitting light having a wavelength of 0.66 µm, and the like, can be used as the photosensitive resin which is the material of the optical axis aligning guide.

The light having a wavelength of 0.66 µm that is mentioned in the above-described publications is transmitted by a multi-mode optical fiber.

Meanwhile, another type of optical fiber besides a multi-mode optical fiber is a single-mode optical fiber for transmitting single-mode light having a wavelength of 1.31 or 1.55 µm, which is used in general trunk systems.

This single-mode optical fiber has a small core having a diameter of approximately 10 µm, which means that the diameter is only about ⅕ and the cross sectional area is only about 1/25 compared with those of the core of a multi-mode optical fiber, so there is a need for a single-mode optical device with which optical axes can be aligned at high precision.

The following problems are encountered when the techniques discussed in the above-described publications are applied to a single-mode optical device.

(1) When a (meth)acrylate radiation-sensitive resin is used as the material to produce a single-mode optical component by photolithography, it is difficult to precisely align the optical axis of the optical waveguide of the single-mode optical component with the optical axis of a single-mode optical fiber having a small diameter.

(2) When a (meth)acrylate radiation-sensitive resin is used, because of the large amount of light absorption at a wavelength of 1.31 or 1.55 µm, a practical level of transmission efficiency cannot be attained.

(3) The heat resistance is not high enough to meet the requirement for improving the reliability of an optical device.

To solve problem (1) in particular, it is necessary to use an alkali developing method which involves the use of a basic substance-containing solution such as an alkaline aqueous solution, instead of a developing method which involves the use of an organic solvent, so as to increase the resolution by photolithography. However, when a (meth) acrylate radiation-sensitive resin is used together with an alkaline aqueous solution, the acid component required in the resin for alkali developing exhibits light absorption at the usage wavelengths (1.31 µm, 1.55 µm) of single-mode light, resulting in a problem of a decrease of optical transmission efficiency.

DISCLOSURE OF THE INVENTION

In light of the above problems encountered with the prior art, it is an object of the present invention to provide an optical waveguide chip with which the optical axes can be aligned at high precision even with single-mode optical fibers, the transmission efficiency of single-mode light is higher, and heat resistance is excellent.

As a result of diligent study aimed at solving the above problems, the inventors perfected the present invention upon discovering that an optical waveguide chip (particularly an optical waveguide chip that can be favorably used for being connecting with single-mode optical fibers) that achieves the before-mentioned object can be obtained by using a polysiloxane-based radiation-sensitive resin instead of a conventional (meth)acrylate-based resin, and providing means for positioning optical fibers at high precision.

Specifically, the optical waveguide chip of the present invention comprises a core portion as an optical waveguide, a clad portion formed around the core portion, and an optical fiber guide portion for positioning an optical fiber which is to be connected to the core portion, and is composed at least partially of a cured radiation-sensitive polysiloxane composition.

With the optical waveguide chip of the present invention constituted in this manner, the optical axes can be aligned at high precision even with single-mode optical fibers, the transmission efficiency of single-mode light is higher, and heat resistance is excellent.

The optical waveguide chip of the present invention is preferably constituted such that each of the core portion, the clad portion, and the optical fiber guide portion is composed of a cured radiation-sensitive polysiloxane composition.

An optical waveguide chip constituted in this manner has even better optical axis alignment precision, optical transmission efficiency, and heat resistance, and can also be manufactured efficiently by simple processes.

The optical fiber guide portion may be formed integrally with the clad portion, or may be formed independently from the clad portion.

The optical waveguide chip of the present invention can be advantageously used in particular as an optical waveguide chip for being connected with a single-mode optical fiber.

The optical waveguide chip of the present invention can have an optical filter insertion hole for inserting an optical filter disposed intersecting with the core portion.

It is possible to complete an optical component (such as an optical multiplexer/demultiplexer) in which a dielectric multilayer filter is attached to the above-mentioned optical waveguide chip by inserting and fixing a dielectric multilayer filter in the optical filter insertion hole.

Because the optical waveguide chip of the present invention is formed at least partially from a radiation-sensitive polysiloxane composition having excellent workability, transmission characteristics, and heat resistance, the optical axis of the optical waveguide can be easily and precisely aligned with the optical axis of an optical fiber. Also, the optical waveguide chip of the present invention can have good transmission efficiency with respect to light of the near infrared wavelength band required for optical communications. Furthermore, the optical waveguide chip of the present invention can maintain its excellent performance even when left at high temperatures, which affords higher reliability (i.e. performance stability) during use.

The optical waveguide chip of the present invention can be advantageously used in particular as a constituent portion of an optical component for being connecting with a single-mode optical fiber whose core portion is smaller in diameter than that of a multi-mode optical fiber.

BEST MODE FOR CARRYING OUT THE INVENTION

Figure 1:
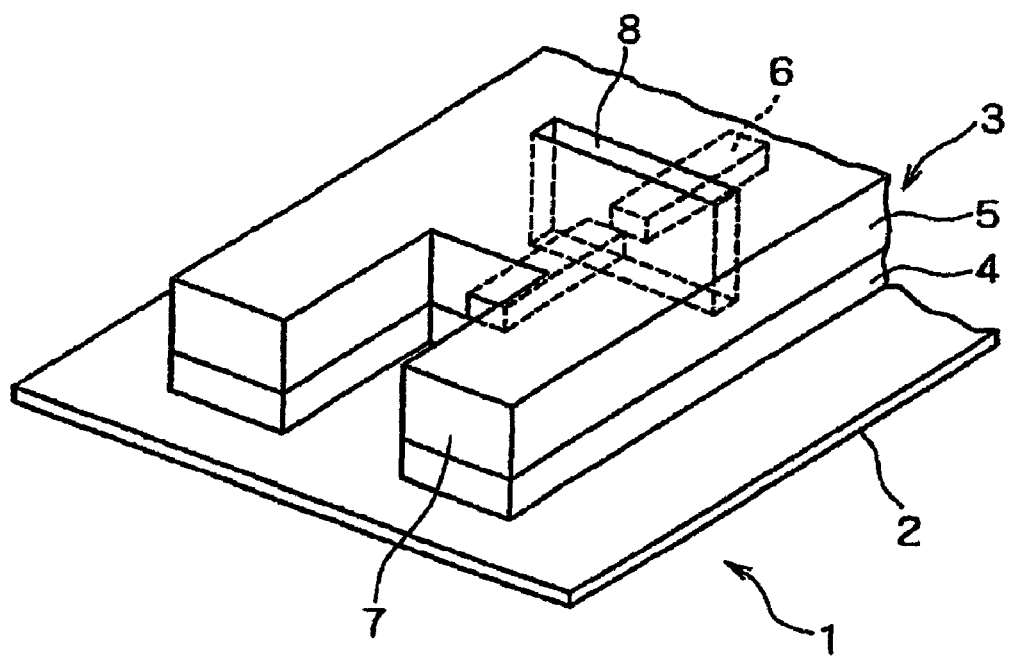
FIG. 1 is a perspective view illustrating an example of an optical waveguide chip.

The present invention will now be described in detail.

First, the radiation-sensitive polysiloxane composition used as the material for the optical waveguide chip of the present invention will be described.

The radiation-sensitive polysiloxane composition used in the present invention preferably contains the following components (A) and (B).

(A) at least one type of compound selected from the group consisting of hydrolyzable silane compounds, hydrolyzates thereof, and condensates of these hydrolyzates (B) a photo-acid generator Each of these components (A) and (B) will now be described.

[Component (A)]

Component (A) is at least one type of compound selected from the group consisting of hydrolyzable silane compounds, hydrolyzates thereof, and condensates of these hydrolyzates.

The hydrolyzable silane compound is a compound expressed by the following general formula (1).

$$(R^1)_p Si(X)_{4-p} \quad (1)$$

(In the formula, $R^1$ is a non-hydrolyzable organic group having 1 to 12 carbon atoms; X is a hydrolyzable group; and p is an integer from 0 to 3.)

The organic group $R^1$ in general formula (1) can be selected from non-hydrolyzable monovalent organic groups. The non-hydrolyzable monovalent organic group may be either polymerizable or non-polymerizable. The word "non-hydrolyzable" means the property of remaining stable under conditions in which the hydrolyzable group X is hydrolyzed.

Examples of the non-polymerizable organic group $R^1$ include an alkyl group, aryl group, and aralkyl group. These organic groups may be linear, branched, or cyclic, or a combination of these.

Examples of the alkyl group include a methyl group, ethyl group, propyl group, butyl group, hexyl group, cyclohexyl group, octyl group, deuterated alkyl group, and halogenated alkyl group. Of these, the use of a methyl group is preferred.

Examples of the aryl group include a phenyl group, tolyl group, xylyl group, naphthyl group, biphenyl group, deuterated aryl group, and halogenated aryl group. Of these, the use of a phenyl group is preferred.

Examples of the aralkyl group include a benzyl group and phenylethyl group. Of these, the use of a benzyl group is preferred.

A preferred example of the non-polymerizable organic group $R^1$ is a structural unit including a hetero atom. Examples of such structural units include a ether bond, ester bond, and sulfide bond. When a hetero atom is included, it is preferably non-basic.

A polymerizable organic group $R^1$ preferably has a radical polymerizable functional group and/or a cationic polymerizable functional group in its molecule. When one of these functional groups is included, radical polymerization or cationic polymerization is carried out in addition to photo-polymerization, resulting in that the curing of the radiation-sensitive polysiloxane composition is carried out more effectively.

Among radical polymerizable functional groups and cationic polymerizable functional groups, cationic polymerizable functional groups are preferred. When a cationic polymerizable functional group is contained in component (A), the photo-acid generator (i.e. component (B)) brings about not only a curing reaction in the silanol groups but also a curing reaction in the cationic polymerizable functional groups at the same time, and this promotes curing and improves manufacturing efficiency.

Examples of the hydrolyzable group X in general formula (1) include a hydrogen atom, alkoxy group having 1 to 12 carbon atoms, phenoxy group, benzyloxy group, acetoxy group, glycidyloxy group, phenoxybenzyloxy group, halogen atom, and amino group.

Preferred examples of the alkoxy group having 1 to 12 carbon atoms include methoxy group, ethoxy group, propoxy group, butoxy group, methoxyethoxy group, acetoxy-ethoxy group, 2-(meth)acryloxyethoxy group, 3-(meth)acryloxypropoxy group, 4-(meth)acryloxybutoxy group; epoxy group-containing alkoxy groups such as 2-(3,4-epoxycyclohexyl)ethoxy group and the like; oxycetanyl group-containing alkoxy groups such as methyloxycetanylmethoxy group, ethyloxycetanylmethoxy group and the like; alkoxy groups having a six member ring ether group such as oxacyclohexyloxy group and the like.

Preferred examples of the halogen atom include fluorine, chlorine, bromine, and iodine.

When a hydrolyzable silane compound in which the hydrolyzable group is a halogen atom is used as component (A), hydrolysis may produce hydrogen halides and lower the storage stability of the radiation-sensitive polysiloxane composition. Accordingly, it is preferable to remove hydrogen halides by neutralization, distillation, or other such operation, although the necessity of this depends on the amount of hydrogen halide being produced.

Examples of the hydrolyzable silane compound used in the present invention will now be described.

Examples of a hydrolyzable silane compound, in which p in general formula (1) is 0, and there is no non-hydrolyzable organic group $R^1$, include silane compounds that have been substituted with four hydrolyzable groups such as tetrachlorosilane, tetraaminosilane, tetraacetoxysilane, tetramethoxysilane, tetraethoxysilane, tetrabutoxysilane, tetraphenoxysilane, tetrabenzyloxysilane, trimethoxysilane, triethoxysilane and the like.

Examples of a hydrolyzable silane compound in which p in general formula (1) is 1 include methyltrichlorosilane, methyltrimethoxysilane, methyltriethoxysilane, methyltributoxysilane, ethyltrimethoxysilane, ethyltriisopropoxysilane, ethyltributoxysilane, butyltrimethoxysilane, pentafluorophenyltrimethoxysilane, phenyltrimethoxysilane, phenyltriethoxysilane, deuterated methyltrimethoxysilane, nonafluorobutylethyltrimethoxysilane, and trifluoromethyltrimethoxysilane.

Examples of a hydrolyzable silane compound in which p in general formula (1) is 2 include dimethyldichlorosilane, dimethyldiaminosilane, dimethyldiacetoxysilane, dimethyldimethoxysilane, diphenyldimethoxysilane, diphenyldiethoxysilane, and dibutyldimethoxysilane.

Examples of a hydrolyzable silane compound in which p in general formula (1) is 3 include trimethylchlorosilane, hexamethyldisilazane, trimethylsilane, tributylsilane, trimethylmethoxysilane, and tributylethoxysilane.

In this specification, the term "hydrolyzate" of a hydrolyzable silane compound is used in a sense that encompasses not only a case in which all of the hydrolyzable groups X in the hydrolyzable silane compound expressed by general formula (1) have been hydrolyzed, but also a case in which only some of the hydrolyzable groups X have been hydrolyzed, and the rest have not.

Also, in this specification, the term "condensate of a hydrolyzate" of a hydrolyzable silane compound is used in a sense that encompasses not only a condensate in which all of the silanol groups converted from alkoxy groups by hydrolysis have been condensed, but also a condensate in which just some of the silanol groups have been condensed.

The refractive index in the optical waveguide can be varied over a wide range by suitably selecting the type of hydrolyzable silane compound. For instance, when a relatively high refractive index (1.50 or higher) is desired, phenyltrimethoxysilane, phenyltriethoxysilane, diphenyldimethoxysilane, diphenyldiethoxysilane or the like is preferably selected from the above-described hydrolyzable silane compounds.

On the other hand, when a relatively low refractive index (lower than 1.50) is desired, methyltrimethoxysilane, methyltriethoxysilane, nonafluorobutylethyltrimethoxysilane, dimethyldichlorosilane, dimethyldiaminosilane, dimethyldiacetoxysilane, dimethyldimethoxysilane, 3,3,4,4,5,5,6,6,7,7,8,8, 9,9,10,10,10-heptadecafluorodecyltrichlorosilane, 3,3,4,4,5,5,6,6,7,7,8,8,9,9,10,10,10-heptadecafluorodecyltrimethoxy-silane or the like is preferably selected from the above-described hydrolyzable silane compounds.

Component (A) is usually prepared by heating the hydrolyzable silane compound expressed by general formula (1). There are no particular restrictions on the method for preparing component (A). For example, a method comprising the following steps 1) to 3) can be used.

1) Place the hydrolyzable silane compound expressed by general formula (1) and an acid catalyst in a vessel having a stirring means.

2) Add an organic solvent while adjusting the viscosity of the solution in the vessel to obtain a mixed solution.

3) Add water while stirring the mixed solution in an air atmosphere and at a temperature below the boiling point of the organic solvent and the hydrolyzable silane compound, and then stir while heating at 150° C. or lower for 1 to 24 hours. If needed during stirring, the mixed solution may be concentrated by distillation, or the organic solvent may be replaced.

In the preparation of component (A), two or more types, rather than just one type, of the hydrolyzable silane compound expressed by general formula (1) can be used together in order to adjust the curability, viscosity, and other properties of the radiation-sensitive polysiloxane composition, or the refractive index of the cured composition. In this case, two or more types of hydrolyzable silane compound expressed by general formula (1) may be placed and mixed in the vessel in step 1) described above.

Examples of the acid catalyst used in step 1) described above include monovalent or polyvalent organic acids, inorganic acids, and Lewis acids.

Examples of the organic acid include formic acid, acetic acid, and oxalic acid. Examples of inorganic acids include hydrochloric acid, nitric acid, and sulfuric acid. Examples of Lewis acids include metal compounds; inorganic salts of titanium, zirconium, aluminum, boron, or the like; alkoxides; and carboxylates.

Examples of the organic solvent used in steps 2) and 3) described above include ether-based organic solvents, ester-based organic solvents, ketone-based organic solvents, hydrocarbon-based organic solvents, alcohol-based organic solvents and the like.

Of these, it is preferable to use an organic solvent whose boiling point under atmospheric pressure is 50 to 200° C. and which is capable of dissolving the various components uniformly. Examples of such organic solvents include propylene glycol monomethyl ether, propylene glycol monomethyl ether acetate, ethyl lactate, methyl isobutyl ketone, methyl amyl ketone, toluene, xylene, methanol and the like.

Next, the weight average molecular weight of the hydrolyzable silane compound hydrolyzate and condensate thereof used as component (A) will be described.

This weight average molecular weight is expressed as a polystyrene equivalent obtained by gel permeation chromatography (hereinafter referred to as "GPC") using tetrahydrofuran as the mobile phase in this specification.

This weight average molecular weight is preferably 500 to 10,000, and even more preferably 1,000 to 5,000. When the weight average molecular weight is less than 500, it may be difficult to form a good coating film. When the weight average molecular weight is over 10,000, photocuring performance may deteriorate.

[Component (B)]

The photo-acid generator contained as component (B) in the radiation-sensitive polysiloxane composition is defined as a compound capable of releasing an acidic active substance for photocuring (i.e. cross-linking) the hydrolyzable silane compound (i.e. component (A)) or the like upon irradiation with light or other such energy ray.

Examples of this energy ray include visible light, UV rays, infrared rays, X rays, alpha rays, beta rays, gamma rays and the like. Of these, UV rays can be advantageously used, because they have a consistent energy level and cure very quickly, and the irradiation apparatus is relatively inexpensive and compact.

Examples of the type of photo-acid generator used as component (B) include onium salts expressed by general formula (2) below, and sulfonic acid derivatives expressed by general formula (3) below.

$$[R^2_a R^3_b R^4_c R^5_d W]^{+m}[MZ_{m+n}]^{-m} \quad (2)$$

(In the formula, the cation is an onium ion, W is S, Se, Te, P, As, Sb, Bi, O, I, Br, Cl, or —N≡N; $R^2$, $R^3$, $R^4$, and $R^5$ are the same or different organic groups; a, b, c, and d are each an integer from 0 to 3; and (a+b+c+d) is equal to the valence of W. M is a metal or metalloid constituting the center atom of the complex $[MZ_{m+n}]$, such as B, P, As, Sb, Fe, Sn, Bi, Al, Ca, In, Ti, Zn, Sc, V, Cr, Mn, or Co. Z is a halogen atom such as F, Cl, Br or the like, or an aryl group; m is the positive charge of the complex ion; and n is the valence of M.)

$$Q_s\text{-}[S(=O)_2\text{—}R^6]_t \quad (3)$$

(In the formula, Q is a monovalent or divalent organic group; $R^6$ is a monovalent organic group having 1 to 12 carbon atoms; s is 0 or 1; and t is 1 or 2.)

There are no particular restrictions on the amount of the photo-acid generator (i.e. component (B)) to be added, but this amount is preferably 0.1 to 15 weight parts, and even more preferably 1 to 10 weight parts, per 100 weight parts of component (A). When the amount to be added is less than 0.1 weight part, photocuring tends to decrease so that curing is too slow. When the amount to be added is over 15 weight parts, the weather resistance and heat resistance of the obtained cured composition tend to decrease.

In the present invention, an optical waveguide chip is manufactured by coating a support with a radiation-sensitive polysiloxane composition containing component (A) and component (B), and then photocuring this composition by photolithography.

The term "photolithography" as used here means a method in which radiation-sensitive polysiloxane composition on a substrate is irradiated with UV rays or other such energy ray via a photomask having a specific pattern, and then the difference in the solubility of the irradiated and non-irradiated portions by a developer is utilized to remove the non-irradiated portion, for example, to obtain a molded body (such as an optical waveguide) having a specific pattern and composed of just the irradiated portion that remains as a cured body.

Because the radiation-sensitive polysiloxane composition has excellent workability, transmission characteristics, and heat resistance, when it is used as the material for an optical waveguide chip for being connected with single-mode optical fibers, the optical axis of the core portion (i.e. optical waveguide) of the optical waveguide chip can be precisely aligned with the optical axis of the single-mode optical fiber, single-mode light can be transmitted at high efficiency, and this excellent performance is maintained even when the chip is used under high temperatures.

Figure 2:
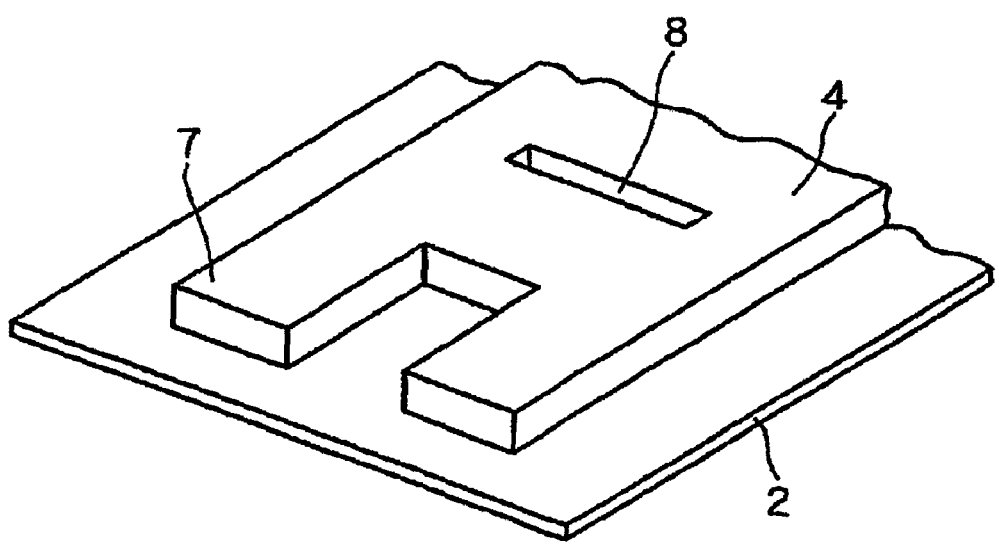
FIG. 2 is a perspective view illustrating the state when a lower clad layer has been formed on a substrate.
Figure 3:
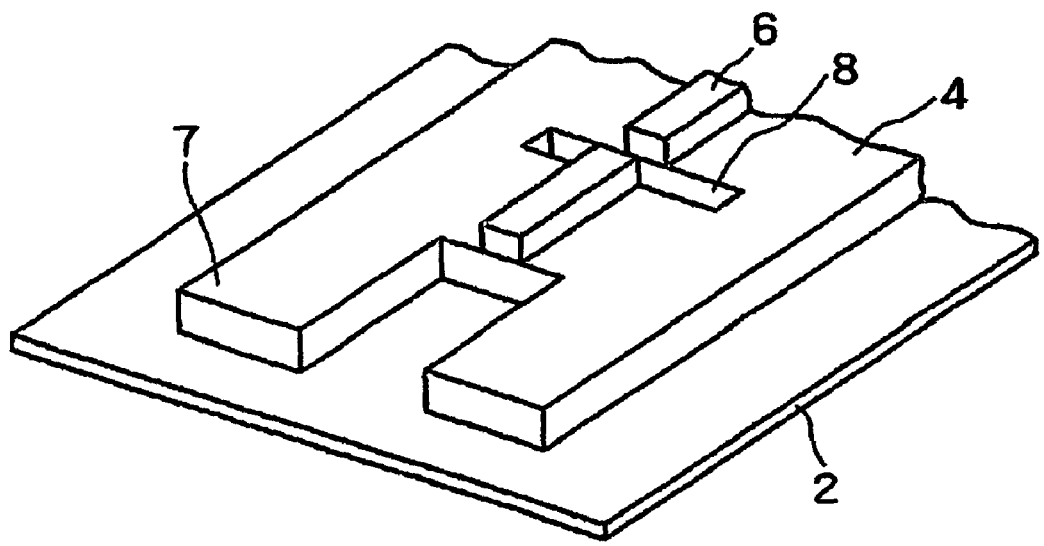
FIG. 3 is a perspective view illustrating the state when a core portion has been formed over the lower clad layer.
Figure 4:
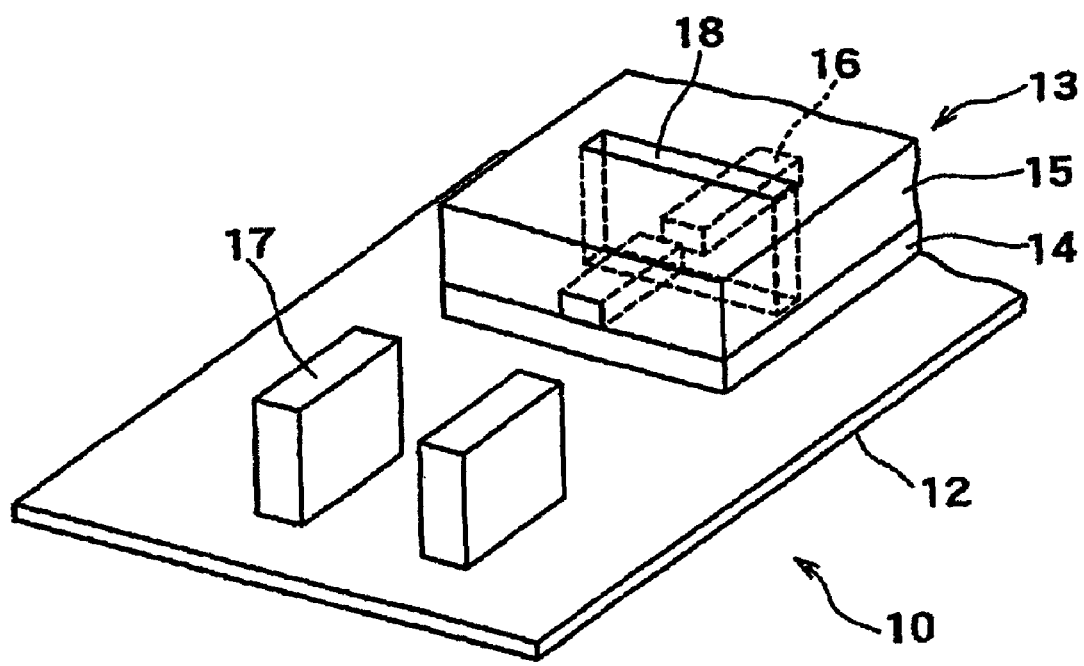
FIG. 4 is a perspective view illustrating another example of an optical waveguide chip.
Figure 5:
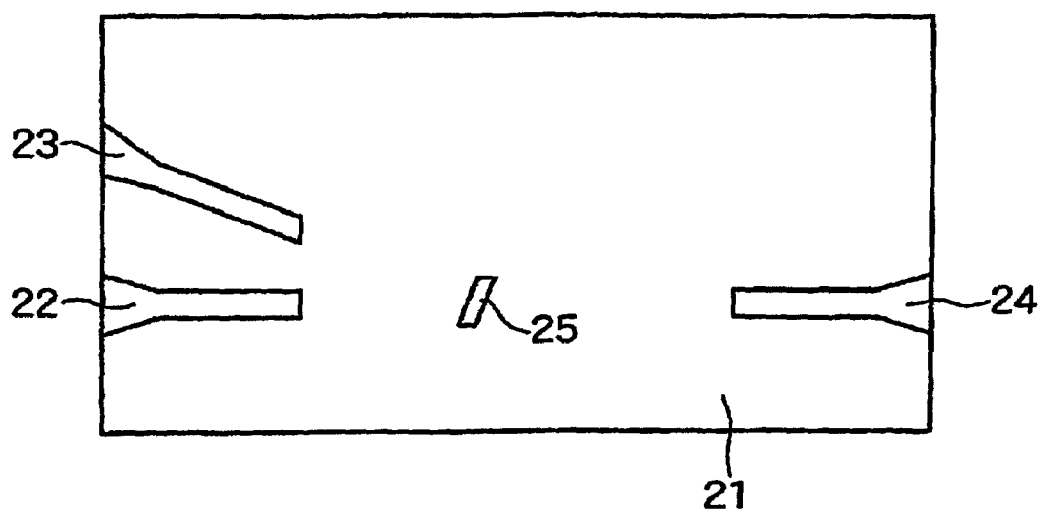
FIG. 5 is a plan view illustrating an example of the lower clad layer.
Figure 6:
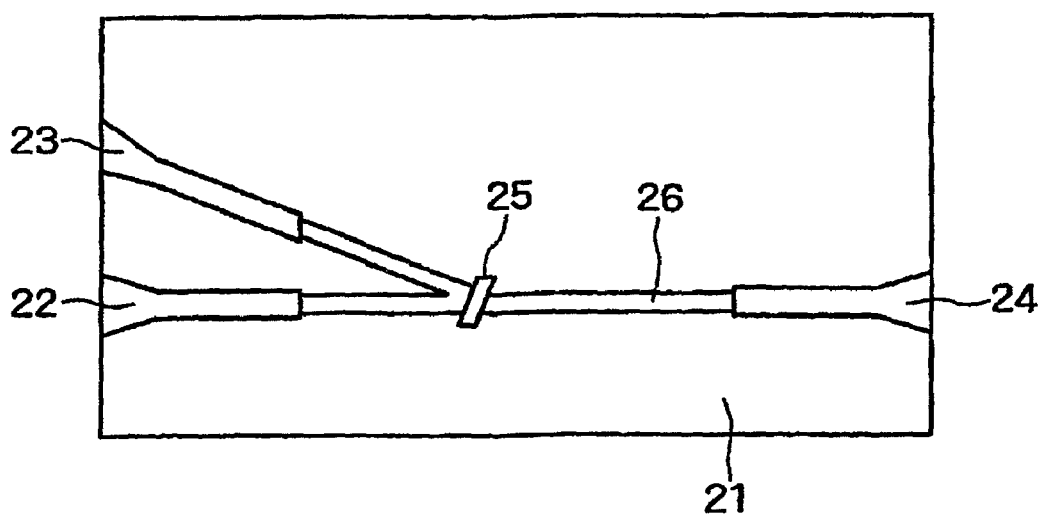
FIG. 6 is a plan view illustrating the state when the core portion has been formed on the lower clad layer.
Figure 7:
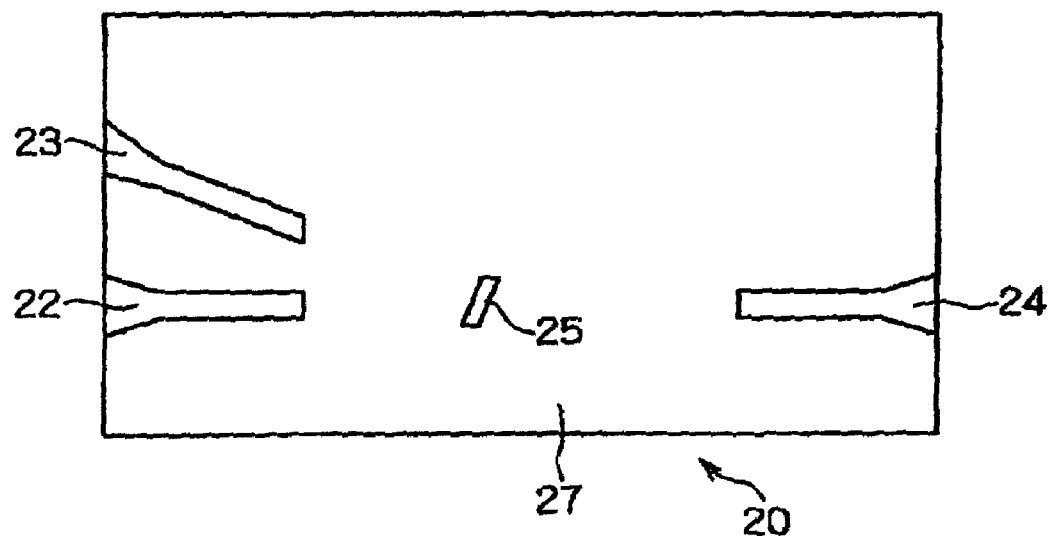
FIG. 7 is a plan view illustrating the state when an upper clad layer has been formed on the lower clad layer and the core portion to complete the optical waveguide chip.
Figure 8:
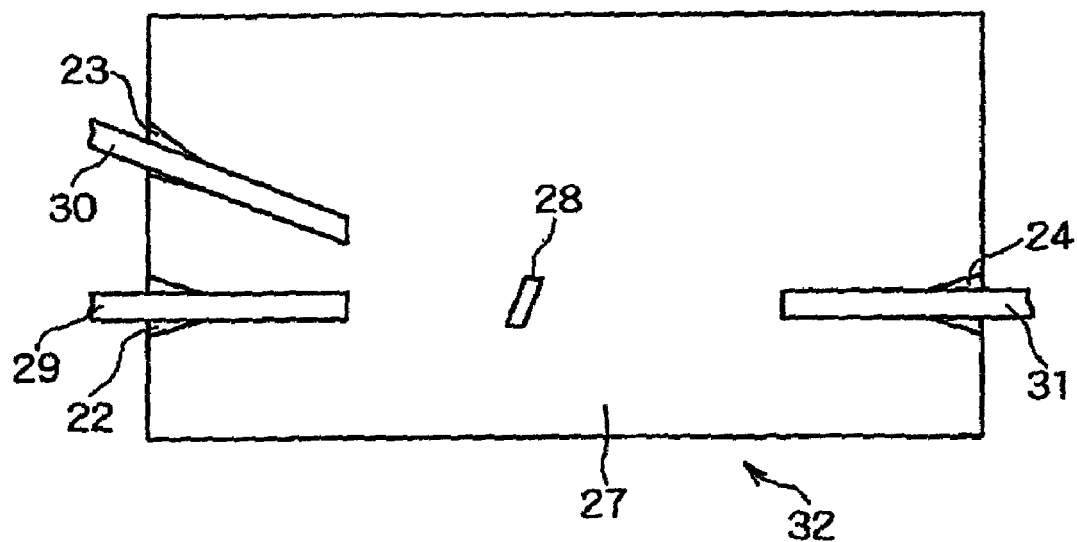
FIG. 8 is a plan view illustrating the state when an optical filter and an optical fiber have been attached to the optical waveguide chip shown in FIG. 7.

Next, the structure and manufacturing method of the optical waveguide chip of the present invention will be described through reference to the drawings. FIG. 1 is a perspective view illustrating an example of an optical waveguide chip; FIG. 2 is a perspective view illustrating the state when a lower clad layer has been formed on a substrate; FIG. 3 is a perspective view illustrating the state when a core portion has been formed on the lower clad layer; FIG. 4 is a perspective view illustrating another example of an optical waveguide chip; FIG. 5 is a plan view illustrating an example of the lower clad layer; FIG. 6 is a plan view illustrating the state when the core portion has been formed on the lower clad layer; FIG. 7 is a plan view illustrating the state when an upper clad layer has been formed on the lower clad layer and the core portion to complete the optical waveguide chip; and FIG. 8 is a plan view illustrating the state when an optical filter and an optical fiber have been attached to the optical waveguide chip shown in FIG. 7.

In FIG. 1, the optical waveguide chip 1 of the present invention comprises a core portion 6 as an optical waveguide, a clad portion 3 composed of a lower clad layer 4 and an upper clad layer 5 formed around the core portion 6, and an optical fiber guide portion 7 which is formed integrally with the clad portion 3.

The core portion 6 is provided at a position so that its optical axis will be aligned with the optical axis of the optical fibers (not shown) inserted into the optical fiber guide portion 7.

The clad portion 3 serves to support and protect the core portion 6, and for reasons dictated by manufacturing, has a two-layer structure consisting of the lower clad layer 4, which is formed on a substrate (i.e. support) 2, and the upper clad layer 5, which is laminated over the lower clad layer 4. It is preferable for the clad portion 3 to be formed so as to cover the core portion 6 all the way around. However, it is also possible that the clad portion 3 is formed only part of the way around the core portion 6 (such as just around the sides and bottom, but not the top).

The optical fiber guide portion 7 is a guidance means for positioning the optical fibers to be connected with the core portion 6. The optical fiber guide portion 7 is a cured product of the radiation-sensitive polysiloxane composition formed integrally with the clad portion 3, and is formed in a shape that allows optical fibers to be positioned and fixed.

There are no particular restrictions on the cross sectional shape (i.e. the shape obtained by being cut perpendicular to the substrate) of the optical fiber guide portion 7. Examples of the shape include a U-shaped bottom, V-shaped bottom, and flat bottom.

The optical fiber guide portion 7 preferably has at least one pair of walls provided facing each other and apart by a distance that substantially coincides with the outside diameter of the optical fiber. Providing these walls prevents loosening and axial runout of the optical fiber after its insertion into the optical fiber guide portion 7 more effectively.

The optical waveguide chip 1 has an optical filter insertion hole 8 provided so as to hang down from the top surface of the clad portion 3 and block off the core portion 6. The optical filter insertion hole 8 is used to insert and fix an optical filter such as a dielectric multilayer filter.

The following are preferable examples of the sizes of the various constituent portions of the optical waveguide chip 1. The thickness of the lower clad layer 4 is 3 to 100 μm, the thickness of the core portion 6 is 3 to 20 μm, the width of the core portion 6 is 1 to 50 μm, the thickness of the upper clad layer 5 is 3 to 100 μm, the distance between the pair of walls constituting the optical fiber guide portion 7 (i.e. the width of the cut-out portion) is 125 to 130 μm, and the depth of the optical filter insertion hole 8 is 10 to 200 μm.

The distance between the pair of walls constituting the optical fiber guide portion 7 (i.e. the width of the cut-out portion) is determined according to the outer diameter of the optical fiber.

The portions constituting the optical waveguide chip 1 in FIG. 1 (i.e. the core portion 6, the clad portion 3, and the optical fiber guide portion 7) are formed from a cured radiation-sensitive polysiloxane composition.

In the present invention, however, it is not necessary for all of the constituent portions of the optical waveguide chip 1 (i.e. the core portion 6, the clad portion 3, and the optical fiber guide portion 7) to be formed from a cured radiation-sensitive polysiloxane composition, and it is also possible for just some of these constituent portions to be formed from a cured radiation-sensitive polysiloxane composition. For instance, the core portion 6 can be formed from a cured radiation-sensitive polysiloxane composition, while the clad portion 3 and the optical fiber guide portion 7 are formed from other materials (such as quartz glass).

With regard to the optical waveguide chip 1, it is necessary for the refractive index of the core portion 6 to be greater than the refractive index of the clad portion 3 (i.e. the lower clad layer 4 and the upper clad layer 5).

More specifically, it is preferable for the refractive index of the core portion 6 to be greater than the refractive index of the clad portion 3 by 0.002 to 0.5.

To obtain particularly good waveguide characteristics, for example, for light having a wavelength of 1,300 to 1,600 nm, it is preferable to adjust the refractive index of the core portion 6 to a value between 1.450 and 1.650, and to adjust the refractive index of the lower clad layer 4 and the upper clad layer 5 to a value between 1.400 and 1.648.

In the present invention, a radiation-sensitive polyimide composition or the like can be used together with the radiation-sensitive polysiloxane composition as the material for the optical waveguide chip 1.

In the present invention, as shown in FIG. 4, an optical fiber guide portion 17 may be formed independently from a clad portion 13. In this case, the optical fiber guide portion 17 may be formed by successive laminations simultaneously with the formation of a lower clad layer 14 and an upper clad layer 15, or may be formed all at once simultaneously with the formation of either the lower clad layer 14 or the upper clad layer 15.

In FIG. 4, an optical waveguide chip 10 comprises the lower clad layer 14 and the optical fiber guide portion 17 formed on a substrate 12, and a core portion 16 and the upper clad layer 15 formed by lamination over the lower clad layer 14. An optical filter insertion hole 18 that passes through the optical waveguide chip 10 from the top surface of the upper clad layer 15 to the bottom surface of the lower clad layer 14 is formed so as to block off the core portion 16, intersecting substantially perpendicular to the optical axis direction of the core portion 16.

Next, an example of a method for manufacturing the optical waveguide chip of the present invention will be described through reference to FIGS. 5 to 8.

The method of the present invention for manufacturing an optical waveguide chip comprises (a) a lower clad layer formation step, (b) a core portion formation step, and (c) an upper clad layer formation step. With these steps (a) to (c), the optical fiber guide portion and the optical filter insertion hole are formed simultaneously with the formation of the lower clad layer and so forth.

[(a) Lower Clad Layer Formation Step]

This step involves forming a lower clad layer 21 on the top surface of a substrate (i.e. support) having a flat surface, such as a silicon substrate or glass substrate (see FIG. 5).

In this step, first, the top surface of the substrate (not shown) is coated with a radiation-sensitive polysiloxane composition used for the lower clad layer. After that, the coating is dried or prebaked (i.e. a heat treatment serving as a pretreatment) to form a thin film for the lower clad layer.

Here, the method for applying the radiation-sensitive polysiloxane composition used for the lower clad layer can be spin coating, dipping, spraying, bar coating, roll coating, curtain coating, gravure printing, silk screening, inkjet printing, or the like. Of these, spin coating is preferred because it gives a thin film having a uniform thickness.

The material constituting the thin film for forming a lower clad layer can be partially cured by being irradiated with light via a photomask having a specific shape.

There are no particular restrictions on the light used for irradiation, but light ranging from ultraviolet to visible band having a wavelength of 200 to 450 nm is usually used, and light containing UV rays having a wavelength of 365 nm is preferably used. The target (i.e. the radiation-sensitive polysiloxane composition) is irradiated in a specific pattern such that the luminosity at a wavelength of 200 to 450 nm is 1 to 1,000 mW/cm$^2$ and the amount of irradiation is 0.01 to 5,000 mJ/cm$^2$, preferably 0.1 to 1,000 mJ/cm$^2$.

The following methods a to c are examples of how light is irradiated in a specific pattern, which are examples other than the method using a photomask which has light transmitting and non-transmitting portions.

a. A method which utilizes the same principle as a liquid crystal display device, involving means for electro-optically forming a mask image composed of light transmitting and non-transmitting portions according to a specific pattern.

b. A method which makes use of a light conducting member comprising a bundle of numerous optical fibers, and in which this light conducting member is used for irradiating light through the optical fibers corresponding to a specific pattern.

c. A method in which a photocuring material is irradiated while scanning laser light or focused light obtained with a lens, mirror, or other such condensing optical system.

The thin film used for the lower clad layer may be prebaked at 50 to 200° C. as needed after optical irradiation.

After optical irradiation, by developing the non-irradiated portion (i.e. unexposed portion) with a developer, the unwanted uncured portion is removed to form a lower clad layer 21 composed of a patterned and cured film (i.e. a cured layer having a predetermined thickness which has optical fiber guide portions 22, 23 and 24, and an optical filter insertion hole 25).

A solution obtained by diluting a basic substance with a solvent can be used as the developer here.

Examples of the basic substance here include sodium hydroxide, potassium hydroxide, sodium carbonate, sodium silicate, sodium metasilicate, ammonia, ethylamine, n-propylamine, diethylamine, di-n-propylamine, triethylamine, methyldiethylamine, ethanolamine, N-methylethanolamine, N,N-dimethylethanolamine, triethanolamine, tetramethylammonium hydroxide, tetraethylammonium hydroxide, tetrabutylammonium hydroxide, choline, pyrrole, piperidine, 1,8-diazabicyclo[5.4.0]-7-undecene, and 1,5-diazabicyclo[4.3.0]-5-nonane.

Examples of the solvent include water, methanol, ethanol, propyl alcohol, butanol, octanol, propylene glycol monomethyl ether, propylene glycol monoethyl ether, N-methylpyrrolidone, formamide, N,N-dimethylformamide, and N,N-dimethylacetamide.

The concentration of basic substance in the developer is usually 0.05 to 25 wt %, and preferably 0.1 to 3.0 wt %.

The developing usually lasts from 30 to 600 seconds. Developing methods that can be employed include puddle developing, dipping, shower developing, and so forth.

When an organic solvent is used as the solvent for the developer, it can be dried directly with air to evaporate the organic solvent and form a patterned thin film.

When water (or an aqueous solution) is used as the solvent for the developer, washing is performed for 30 to 90 seconds with flowing water, for example. After that, compressed air, compressed nitrogen, or the like is used for air-drying to remove the water, and to form a patterned thin film.

It is preferable to perform a heat treatment after exposure in order to promote the curing of the exposed portion. The heating conditions will vary with the makeup of the radiation-sensitive polysiloxane composition, the types of additives used, and so forth, but the temperature is usually from 30 to 200° C., and preferably 50 to 150° C.

In addition to a heat treatment after exposure, it is preferable to perform post-baking (i.e. an after-treatment heat treatment) so that the entire thin film will be thoroughly cured. The heating conditions here will also vary with the makeup of the radiation-sensitive polysiloxane composition, the types of additives used, and so forth, but the temperature is usually from 30 to 400° C., and preferably 50 to 300° C. There are no particular restrictions on the heating time, but it may be from 5 minutes to 72 hours, for example.

The method for applying the radiation-sensitive polysiloxane composition, the amount and method of irradiation with light (i.e. energy ray) during exposure, and so forth in the lower clad layer formation step (a) can also be applied to the core portion formation step (b) and the upper clad layer formation step (c) discussed below.

[(b) Core Portion Formation Step]

This step involves forming a core portion 26 on the lower clad layer 21 obtained in the above step (a) (see FIG. 6).

In this step, first the lower clad layer 21 is coated with the radiation-sensitive polysiloxane composition used for the core portion, and the coating is dried and, if needed, pre-baked to form a thin film for the core portion.

After that, the top surface of the thin film for the core portion is irradiated with light by a specific pattern formation method such as interposing a photomask having a specific line pattern. This irradiation is followed by developing with a developer to remove the unwanted uncured portion and form the core portion 26 composed of just the exposed (i.e. cured) portion.

Then, just as with the lower clad layer 21, a hot plate, oven, or other such heating means can be used to post-bake this product for 5 to 600 minutes at a temperature of 30 to 400° C., for example, to obtain the core portion 26 in a good cured state.

[(c) Upper Clad Layer Formation Step]

This step involves forming an upper clad layer 27 on the cured product composed of the core portion 26 and the lower clad layer 21 obtained in the above step (b) (see FIG. 7).

In this step, first a radiation-sensitive polysiloxane composition for forming the upper clad layer is applied from above the cured product composed of the core portion 26 and the lower clad layer 21, and the coating is dried and, if needed, pre-baked to form a thin film for the upper clad layer.

Then, the top surface of the upper clad layer thin film is irradiated with light by a specific pattern formation method such as interposing a photomask having a specific line pattern. This irradiation is followed by developing with a developer to remove the unwanted uncured portion and form the upper clad layer 27 composed of just the exposed (i.e. cured) portion.

The upper clad layer 27 is preferably further subjected as needed to the same heat treatment (i.e. post-baking) as the heat treatment (i.e. post-baking) performed in step (a) above. Performing this heat treatment (i.e. post-baking) yields an upper clad layer 27 with excellent hardness and heat resistance.

In the formation of the portions of the optical waveguide chip 20 (i.e. the upper clad layer 27, the core portion 26, and the lower clad layer 21), optical fiber guide portions 22, 23 and 24 and an optical filter insertion hole 25 can be formed all the way through some or all of the layers by producing the optical waveguide chip 20 by laminating the various layers while accurately positioning them, using a specific photomask that will allow the formation of the optical filter insertion hole 25 and so forth.

An optical component (i.e. optical multiplexer/demultiplexer) 32 can be completed by inserting and fixing an optical filter 28 in the optical filter insertion hole 25 of the optical waveguide chip 20 (see FIGS. 7 and 8). An example of a favorable type of optical filter 28 is a dielectric multilayer filter.

An example of the meaning for fixing the optical filter 28 is adhesion with a UV-curing adhesive. A UV adhesive can be advantageously used in that it allows fixing in a short time at room temperature, and there is little loss due to optical reflection. Specific examples of UV adhesives include UV-curing acrylate resins and epoxy resins.

The optical component 32 can be used favorably as an optical multiplexer/demultiplexer for being connecting with single-mode optical fibers.

EXAMPLES

Examples of the present invention will now be described. The present invention, however, is not limited to these examples, and within the scope of the patent claims, can encompass a variety of embodiments.

(1) Preparation of Radiation-Sensitive Polysiloxane Composition

① Preparation of Radiation-Sensitive Composition for Forming a Core Portion 68.4 g (0.34 mol) of phenyltrimethoxysilane, 131.6 g (0.96 mol) of methyltrimethoxysilane, 70.8 g (3.94 mol) of ion exchange water, and 0.1 g ($1.1 \times 10^{-3}$ mol) of oxalic acid were put in a vessel equipped with a stirrer. The contents were stirred for 6 hours at 60° C. to hydrolyze the phenyltrimethoxysilane and methyltrimethoxysilane.

Next, propylene glycol monomethyl ether was added to the vessel. After that, an evaporator was used to remove the by-product methanol resulting from hydrolysis. This eventually yielded a propylene glycol monomethyl ether solution containing polysiloxane, whose solids content was adjusted to 67 wt %. This solution shall be referred to as a "polysiloxane solution for forming a core portion." The weight average molecular weight of the polysiloxane solution 1 was determined to be 2,500 by GPC analysis.

149.2 g (solids content: 100 g) of the polysiloxane solution for forming a core portion, 50.2 g of propylene glycol monomethyl ether, 1.0 g of triphenyl sulfonium trifluoromethyl sulfonate, 0.20 g of hydroxymethylanthracene, and 0.5 g of a propylene glycol monomethyl ether solution containing 2 wt % of trioctylamine were mixed to create a uniform solution which is 201.2 g (solids content: 50 wt %) of a radiation-sensitive composition for forming a core portion having a viscosity of 45 mPa·s at 25° C.

The refractive index of the obtained radiation-sensitive composition for forming a core portion was measured as follows.

First, a silicon wafer was spin-coated with the radiation-sensitive composition for forming a core portion to have a thickness of 10 µm. After that, this coating was pre-baked (i.e. pretreatment heating) for 10 minutes at 120° C., and then irradiated (i.e. exposed) with light using a high pressure mercury vapor lamp (500 mJ/cm$^2$). After this exposure, the product was baked (i.e. heated) for 1 minute at 100° C., then post-baked (i.e. after-treatment heating) for 1 hour at 200° C. to produce a cured film. The refractive index of this cured film was measured by prism coupler method and found to be 1.471 for light having a wavelength of 1.30 µm, and 1.469 for light having a wavelength of 1.55 µm.

② Preparation of Radiation-Sensitive Composition for Forming a Clad Portion 450 g (4.50 mol) of methyl methacrylate, 50 g (0.20 mol) of methacryloxypropyltrimethoxysilane, 600 g of propylene glycol monomethyl ether, and 35 g (0.14 mol) of 2,2'-azobis-(2,4-dimethylvaleronitrile) were put in a vessel equipped with a stirrer. After that, the gas in the vessel was replaced with nitrogen gas. The temperature inside the vessel was then set to 70° C. and the contents were stirred for 6 hours. This eventually yielded a propylene glycol monomethyl ether solution (i.e. acrylic polymer solution) containing an acrylic polymer, whose solids concentration was adjusted to 45 wt %.

133.33 g of the obtained acrylic polymer solution, 231.36 g (1.70 mol) of methyltrimethoxysilane, 193.48 g (0.97 mol) of phenyltrimethoxysilane, 108.48 g (6.0 mol) of ion exchange water, and 0.30 g (3.32×10$^{-3}$ mol) of oxalic acid were put in a vessel and stirred for 6 hours at 60° C. to subject the phenyltrimethoxysilane, methyltrimethoxysilane, and acrylic polymer solution to hydrolysis and co-condensation.

Next, an evaporator was used to remove the by-product methanol resulting from hydrolysis. This eventually yielded a propylene glycol monomethyl ether solution containing polysiloxane (i.e. polysiloxane solution), whose solids content was adjusted to 70 wt %. This polysiloxane solution shall be referred to as a "polysiloxane solution for forming a clad portion."

142.8 g (solids content: 100 g) of the polysiloxane solution for forming a clad portion, 20.5 g of propylene glycol monomethyl ether, 2.0 g of triphenyl sulfonium.trifluoromethyl sulfonate, 0.67 g of hydroxymethylanthracene, and 0.5 g of a propylene glycol monoethyl ether solution containing 2 wt % trioctylamine were mixed to create a uniform solution which is 166.6 g (solids content: 61 wt %) of a radiation-sensitive composition for forming a clad portion having a viscosity of 2,500 mPa·s at 25° C.

The refractive index of the resulting radiation-sensitive composition for forming a clad portion was measured as follows.

A silicon wafer was spin-coated with the radiation-sensitive composition for forming a clad portion in a thickness of 10 µm. After that, this coating was pre-baked (i.e. pretreatment heating) for 5 minutes at 100° C., and then exposed by optical irradiation using a high pressure mercury vapor lamp (500 mJ/cm$^2$). The coating then was baked (i.e. heat treatment) for 2 minutes at 100° C., then post-baked (i.e. after-treatment heating) for 1 hour at 200° C. to produce a cured film. The refractive index of this cured film was measured by prism coupler method and found to be 1.465 for light having a wavelength of 1.30 µm, and 1.463 for light having a wavelength of 1.55 µm.

(2) Manufacture of Optical Multiplexer/Demultiplexer

An optical multiplexer/demultiplexer was manufactured as follows using the above-mentioned radiation-sensitive composition for forming a core portion and radiation-sensitive composition for forming a clad portion. The following description refers to FIGS. 5 to 8.

[Step 1]

The lower clad layer 21 composed of the radiation-sensitive composition for forming a clad portion was formed on a silicon wafer by photolithography (see FIG. 5).

The lower clad layer 21 comprised three optical fiber guide portions corresponding to three ports for incidence, reflection, and transmission (namely, an incidence port-side optical fiber guide portion 22, a reflection port-side optical fiber guide portion 23, and a transmission port-side optical fiber guide portion 24), and an optical filter insertion hole 25 in which a dielectric multilayer filter is inserted. The thickness of the lower clad layer 21 was 58.5 µm.

The optical fiber guide portions 22, 23, and 24 were groove-shaped portions formed integrally with the lower clad layer. The optical fiber guide portions 22, 23, and 24 had a width (i.e. the width of a cross section cut perpendicular to the optical axis direction of the optical fiber) of 125 µm and a thickness of 58.5 µm. The width (i.e. the width of a cross section cut perpendicular to the optical axis of the core portion 26) of the optical filter insertion hole 25 was 20 µm.

[Step 2]

A Y-shaped core portion 26 (width: 8 µm, height: 8 µm) composed of the radiation-sensitive composition for forming a core portion was formed on the lower clad layer 21 by photolithography (see FIG. 6).

A blocked-off portion of the core portion (i.e. a portion where the radiation-sensitive composition for forming a core portion was not formed) was provided in the approximate center of the core portion 26 (i.e. near the center of the "Y" of the Y-shape) in the same position as the optical filter insertion hole 25 formed in Step 1 above.

[Step 3]

An upper clad layer 27 (thickness: 30 µm) composed of the radiation-sensitive composition for forming a clad portion was formed on the lower clad layer 21 and the core portion 26 by photolithography (see FIG. 7).

The upper clad layer 27 was formed so that its pattern matched up with that of the lower clad layer 21. The optical waveguide chip 20 thus obtained was formed such that its incidence port-side optical fiber guide portion 22, reflection port-side optical fiber guide portion 23, transmission port-side optical fiber guide portion 24, and optical filter insertion hole 25 all had smooth inner surfaces.

[Step 4]

The optical filter (i.e. dielectric multilayer filter) 28 was inserted into the optical filter insertion hole 25 of the optical waveguide chip 20 obtained in Step 3 and fixed with a UV adhesive to obtain an optical component (i.e. optical multiplexer/demultiplexer) 32 (see FIG. 8).

The dielectric multilayer filter 28 used here had characteristics such that it transmitted light of 1.31 µm, and reflected light of 1.55 µm without transmitting. In this case, if light of 1.31 µm is incident inside the optical waveguide chip 20 from the optical fiber 29 on the incidence port side, the incident light is transmitted mainly to the transmission port side (i.e. the side of the optical fiber 31), and less light is reflected and emitted to the reflection port side (i.e. the side of the optical fiber 30). Meanwhile, if light of 1.55 µm is incident inside the optical waveguide chip 20 from optical fiber 29 on the incidence port side, the incident light is reflected and emitted mainly to the reflection port side (i.e. the side of the optical fiber 30), and less light is transmitted to the transmission port side (i.e. the side of the optical fiber 31).

[Step 5]

Three single-mode quartz fibers 29, 30, and 31 having polished end faces and having an outer diameter of 125 µm (core diameter: 10 µm) were inserted into the three optical fiber guide portions 22, 23, and 24 and fixed with a UV adhesive (FIG. 8).

(3) Evaluation of Optical Characteristics of the Optical Waveguide Chip

The optical multiplexer/demultiplexer 32 thus obtained was used to evaluate the optical characteristics of the optical waveguide chip 20 as follows.

① Measurement of Loss

Each of the amount of light emitted from the optical fiber 30 on the reflection port side and the amount of light emitted from the optical fiber 31 on the transmission port side was measured with an optical power meter (MT9810, made by Anritsu) by making light having a wavelength of 1.31 µm or 1.55 µm to be incident on the optical waveguide chip 20 from the optical fiber 29 on the incidence port side. The amount of light thus obtained was compared with the amount of incident light to determine the amount of loss. The amount of loss measured at the optical fiber 30 on the reflection port side is hereinafter be referred to as the "insertion loss at the reflection port," and the loss measured at the optical fiber 31 on the transmission port side will be referred to as the "insertion loss at the transmission port." The results are given in Table 1.

TABLE 1

| Wavelength (µm) | Insertion loss at transmission port (dB) | Insertion loss at reflection port (dB) |
|---|---|---|
| 1.31 | −3.7 | <−25 |
| 1.55 | <−50 | −4.8 |

When lights having two wavelengths of 1.31 µm and 1.55 µm for single-mode were incident on the optical component 32, these lights having the two wavelengths was divided into the transmission port side and the reflection port side on the basis of the characteristics of the film dielectric multilayer filter 28. Here, as shown in Table 1, the insertion loss at the transmission port of light having a wavelength of 1.31 µm, and the insertion loss at the reflection port of light having a wavelength of 1.55 µm were both sufficiently low. Accordingly, it is confirmed that the optical waveguide chip 20 of the present invention had good workability and transmission efficiency for being connected with a single-mode optical fiber.

The invention claimed is:

1. A method for manufacturing an optical waveguide chip comprising a core portion as an optical waveguide, a clad portion, which is composed of a lower clad layer and an upper clad layer and which is formed around the core portion, and an optical fiber guide portion for positioning an optical fiber which is to be connected with the core portion, each appropriately positioned on a supporting substrate, comprising:

forming said core portion, said clad portion, which is composed of said lower clad layer and said upper clad layer, and said optical fiber guide portion from appropriately positioned radiation-sensitive polysiloxane composition on the substrate, whereby the patterning of the positioned radiation-sensitive polysiloxane composition into the components of the optical waveguide components is developed by treatment with an alkali developing agent; and wherein the upper clad layer and the optical fiber guide portion are formed simultaneously as they are patterned during the alkali development.

2. The method for manufacturing an optical waveguide chip according to claim 1, wherein the optical waveguide chip is connected to a single-mode optical fiber.

3. The method for manufacturing an optical waveguide chip according to claim 1, wherein an optical filter insertion hole, through which an optical filter is inserted and is positioned so that it intersects said core portion, is formed concurrently with the core portion, the lower clad layer and the upper clad layer.

4. The method for manufacturing an optical waveguide chip according to claim 3, which further comprises inserting and fixing a dielectric multilayer filter as the optical filter in said optical filter insertion hole.

5. The method for manufacturing an optical waveguide chip according to claim 1, wherein the radiation-sensitive polysiloxane composition contains a photo-acid generator.

6. The method for manufacturing an optical waveguide chip according to claim 1, wherein all of the material of the optical fiber guide portion is the same as the material of the clad portion.

* * * * *